US007877289B1

(12) United States Patent
Cunningham et al.

(10) Patent No.: US 7,877,289 B1
(45) Date of Patent: *Jan. 25, 2011

(54) CONTROLLED OFFER REDEMPTION SYSTEM

(75) Inventors: William R. Cunningham, Anna, IL (US); Richard W. White, Milton, FL (US)

(73) Assignee: Cunningham Electronics Corporation, Anna, IL (US)

( * ) Notice: Subject to any disclaimer, the term of this patent is extended or adjusted under 35 U.S.C. 154(b) by 980 days.

This patent is subject to a terminal disclaimer.

(21) Appl. No.: 11/202,768

(22) Filed: Aug. 12, 2005

Related U.S. Application Data

(60) Provisional application No. 60/601,194, filed on Aug. 13, 2004.

(51) Int. Cl.
*G06Q 30/00* (2006.01)
(52) U.S. Cl. .................................. 705/14.26
(58) Field of Classification Search .................. 705/14, 705/14.26
See application file for complete search history.

(56) References Cited

U.S. PATENT DOCUMENTS

| 5,128,520 A * | 7/1992 | Rando et al. ............... 235/375 |
| 5,256,863 A * | 10/1993 | Ferguson et al. .............. 705/21 |
| 5,428,684 A * | 6/1995 | Akiyama et al. .............. 705/66 |
| 7,055,031 B2 * | 5/2006 | Platt ........................ 713/168 |
| 2003/0061170 A1 * | 3/2003 | Uzo ............................. 705/64 |
| 2003/0064713 A1 * | 4/2003 | Deshpande ................. 455/414 |

FOREIGN PATENT DOCUMENTS

WO        WO 95/30199        * 11/1995

\* cited by examiner

*Primary Examiner*—John G Weiss
*Assistant Examiner*—Matthew L Hamilton
(74) *Attorney, Agent, or Firm*—Levenfeld Pearlstein, LLC

(57) ABSTRACT

A controlled offer redemption system used to validate, verify, and redeem manufacturers' offers, retailers' offers, and cooperative offers, to restrict the redemption of retailers' offers and cooperative offers to particular retailers, and to authenticate the offer redemption transactions. The system is a closed system in a controlled environment. The system includes a master registry where offers are registered, an offer redemption terminal in communication with a retailer's point-of-sale ("POS") system, a store portal and an offer clearinghouse. The store portal communicates with the registry to maintain an updated database of valid offers. The POS system communicates with the offer redemption terminal to validate and verify offers presented for redemption. The offer redemption terminal includes a means to generate an encrypted identifier ("token") which is unique to each offer redemption transaction. The encrypted token is attached to the purchase event transaction, and the purchase event transaction (including the token) is transmitted to the offer clearinghouse. The clearinghouse independently recreates the token based on the offer redemption record and the purchase event transaction log and authenticates the transaction as having originated under the controlled conditions imposed by the system, which includes destruction of the redeemed offer and limited redemption of retailers' and cooperative offers to the authorized retailer(s).

29 Claims, 7 Drawing Sheets

CEC Offer Redemption Terminal

CONTROLLED OFFER REDEMPTION SYSTEM

CROSS-REFERENCE TO RELATED APPLICATIONS

This application claims the benefit of U.S. Provisional Application No. 60/601,194, filed Aug. 13, 2004.

STATEMENT REGARDING FEDERALLY SPONSORED RESEARCH OR DEVELOPMENT

Not Applicable

REFERENCE TO A SEQUENCE LISTING, TABLE, OR COMPUTER PROGRAM LISTING

Not Applicable

BACKGROUND OF THE INVENTION (1) Field of the Invention

The present invention relates generally to offers (traditionally known as "coupons") and, more particularly, to a controlled offer redemption system (the "system") used to validate, verify, and redeem manufacturers' offers, retailers' offers, and cooperative offers (offers made cooperatively by a manufacturer and a retailer), to restrict the redemption of cooperative and retailers' offers to particular retailers, and to authenticate the offer redemption transactions.

(2) Description of the Prior Art

Manufacturers reimburse money to retailers based on the retailers' sales volume of the manufacturers' products. These reimbursements are referred to as "trade dollars." Theoretically, trade dollars are to be spent by the retailers to promote the manufacturers' products. Such is done by advertising and running specials in the retailers' stores, such as a large display of highly discounted soft drinks in the front of a retailer's store. The display and low price last for a few days and then are removed by the retailer. However, manufacturers have no way of policing the expenditure of trade dollars by retailers. Most retailers do very little, if any, promotion of the manufacturers' products. Instead, most retailers treat trade dollars as a volume discount and put the money in their pocket. Some retailers run promotions just long enough to claim that they were run and put the remaining trade dollars in their pockets.

Retailers' offers and cooperative offers generally have been unaccepted by the industry because the prior art has not developed a system to control their redemption. Common retailer marketing strategies, such as accepting competitor's coupons, has deterred the use of such offers since manufacturers cannot correlate redemption of such offers with specific trade dollar expenditures. Therefore, what is needed is a controlled manufacturers', retailers', and cooperative offer issuance and redemption system that has the ability to verify, validate, and redeem standard manufacturers' offers, retailers' offers, and cooperative offers, and also to restrict the redemption of retailers' and cooperative offers to particular retailers. A discussion of the prior art related to the redemption of manufacturers' offers follows to add perspective to the nature of the present invention.

Manufacturers' offers have become a valuable marketing tool for manufacturers and retailers seeking to increase sales and collect consumer demographic information. Although manufacturers' offers were first introduced decades ago, the process for redeeming manufacturers' offers has remained relatively unchanged.

The traditional manufacturer's offer redemption process typically involves consumer collection of published manufacturers' offers, often found in Sunday newspapers, direct mailings, and other publications. Manufacturers' offers are presented for redemption by the consumer to a retailer at the retailer's cash register when making a purchase. The manufacturers' offers generally are inspected by the retailer's cashier to confirm the expiration date. Sometimes, but not regularly, the cashier may choose to review the purchased products to determine whether or not the consumer actually purchased the products (in the correct sizes, quantities, and/or combinations) required by the manufacturers' offers. The cashier then manually enters the values of the manufacturers' offers in the cash register for subtraction from the total purchase price.

The manufacturers' offers collected by retailers then are manually sorted and returned to the manufacturers for reimbursement. Typically, this is done by a professional clearinghouse. Retailers bundle together redeemed manufacturers' offers and ship them to the clearinghouse. The clearinghouse then sorts the manufacturers' offers by manufacturer and retailer and forwards the manufacturers' offers to the correct manufacturer along with an invoice for payment. The manufacturer generally reviews the manufacturers' offers for evidence of fraud (for example, a large number of evenly cut offers) or other irregularities and then issues checks to the retailers, through the clearinghouse, based on the number of manufacturers' offers that the manufacturer deems valid. If some manufacturers' offers are deemed invalid, the retailers will not be paid for such offers. This is known as a "chargeback." Such chargebacks then typically are deducted from retailers' future payments to the manufacturer for products delivered to the retailers. This time-consuming process creates additional costs for manufacturers, retailers, and, ultimately and ironically, consumers.

Not only is the traditional prior art manufacturer's offer redemption process costly, it is replete with opportunities to defraud manufacturers on various levels. For example, with the advent of relatively inexpensive and high-quality personal computer equipment, manufacturers' offers may be forged. Additionally, consumers may submit expired manufacturers' offers or manufacturers' offers for products, sizes, quantities, and/or combinations that were not actually purchased. That is, traditional methods of manufacturer's offer redemption do not correlate a specific product sale to each specific redeemed manufacturer's offer at the time of redemption at the retailer. Moreover, it has recently been reported that fraudulent manufacturer's offer redemption schemes may have financed terrorist activities.

In response to the spread of fraudulent redemption of manufacturers' offers, the prior art has seen several systems developed to counter fraud. Some such systems make use of the universal product coupon codes ("UPCs") and UCC/EAN-128 extended barcodes that already appear on products and some manufacturers' offers. Manufacturers' offers encoded with UPC coupon and UCC-EAN-128 extended barcodes can be scanned by both traditional and customized point-of-sale ("POS") barcode readers. On a manufacturer's offer, the UPC coupon and UCC/EAN-128 extended barcode data may include the manufacturer's offer expiration date, the offer value, the required product size and quantity, and the like. It is expected that over the next several years, UPC coupon and UCC/EAN-128 extended barcodes will be supplanted by reduced space symbology ("RSS") barcodes which allow even more data to be stored in the same amount of space.

In some prior art retailer POS systems, the values of the manufacturers' offers are automatically deducted from the total purchase price using a scanning device to scan barcoded manufacturers' offers. Other prior art systems provide that as a manufacturer's offer is scanned, it may be checked against a database file to ensure that it is a valid offer. Some prior art systems even go so far as to compare the manufacturer's offer barcode data to the transaction log of purchased products to confirm that the required product actually was purchased in the correct size and quantity and, if so, destroy or otherwise invalidate the manufacturer's offer. However, unless such a process is completed in a closed, controlled environment, with the ability to independently audit the manufacturer's offer redemption transaction, the possibility of fraud exists.

Therefore, what is needed to eliminate fraud and to permit the proper redemption of manufacturers', retailers', and cooperative offers is a closed system—a controlled offer redemption environment in which manufacturers' offers, retailers' offers, and cooperative offers may be verified, validated, redeemed, and destroyed to prevent re-use, in which the redemption transaction is authenticated to confirm that the offer in fact was redeemed under the controlled conditions imposed by the system, and in which redemption of retailers' offers and cooperative offers is limited only to the retailers that issued the offers or the retailers with whom the manufacturers have cooperatively issued the offers. The present invention satisfies this need.

BRIEF SUMMARY OF THE INVENTION

The present invention is a closed system that eliminates fraud in the offer redemption process and allows manufacturers' offers, retailers' offers, and cooperative offers to be redeemed under controlled conditions. The system utilizes an offer redemption terminal consisting of a housing containing a barcode scanner for reading the data on bar-coded offers, a shredder to render the offers invalid for subsequent use, and a means to generate an encrypted identifier, or "token," which is unique to each offer redemption transaction. The encrypted token is attached to the point of sale ("POS") purchase event transaction, and is used to verify that the transaction originated under the controlled conditions imposed by the system.

The offer redemption terminal is connected to a cash register that is part of the retailer's POS system and, upon activation, receives the purchase event transaction log identifier and current date from the cash register. The purchase event transaction log identifier, along with the barcoded offer data, the current date, and other information form the basis of the encrypted token. When the transaction is later submitted for reimbursement and/or audited, a token is independently regenerated from the purchase event transaction log to compare to the token generated during the transaction. Since the token generated during the transaction could only have originated under the controlled conditions imposed by the operation of the offer redemption terminal, which includes destruction of the redeemed offer and redemption of retailers' and cooperative offers only by authorized retailers, the authenticity of the transaction therefore is verified if the tokens match.

The offer redemption terminal is operated by inserting a manufacturer's offer, retailer's offer, or cooperative offer into a slot with the offer barcode oriented for the scanner to read the barcode. The scanner senses the presence of the offer, reads the barcode, and communicates the barcode data to the POS terminal for verification and validation using a database registry of known valid manufacturers', retailers', and cooperative offers. If the offer is valid and the offer's terms have been satisfied, the cash register activates the offer redemption terminal's shredder which pulls the offer through the shredder and destroys it. Upon sensing that the offer has been shredded, the offer redemption terminal generates the token and communicates it to the cash register where the transaction is then posted and the token is attached to the offer redemption record in the purchase event transaction log.

The system further includes a central master offer registry where manufacturers' offers, retailers' offers, and cooperative offers are registered. The offer registry provides the source for offer data against which each offer is validated and verified. The offer registry is downloaded to the retailer's POS systems and updated on a regular, scheduled basis. The data is stored in the retailer's POS system in the form of a database, where the offers can be matched to the database records to insure that altered or unapproved offers are not redeemed.

The system also includes a clearinghouse to facilitate settlement of accounts between manufacturers and retailers. The clearinghouse also serves to verify that offer transactions submitted for payment are valid. Purchase events containing offer redemption transactions with tokens are screened for authenticity by recreating a token based on the purchase event information; if the recreated token matches the token that was attached to the offer transaction, then the transaction is deemed authentic. The clearinghouse further authenticates the transaction by revalidating and reverifying the offer using the data from the offer registry and the purchase event transaction log.

It is therefore a principal object of the present invention to permit the controlled redemption of manufacturers' offers, retailers' offers, and cooperative offers.

An additional principal object of the present invention to provide an offer redemption system that eliminates fraud.

Another object of the invention is to provide an offer redemption system that reduces costs to manufactures, retailers, and consumers.

A further object of the present invention is to provide an offer redemption system that verifies the validity of an offer before redeeming it.

Yet another object of the present invention is to provide an offer redemption system that generates an encrypted token to verify and authenticate an offer redemption transaction.

It is another object of the present invention to provide an offer redemption system that is interoperable with a retailer's point of sale system.

Another object of the present invention is to provide an offer redemption system that includes a terminal with a means to prevent re-use of an offer once it has been validated and redeemed.

A further object of the present invention is to provide an offer redemption system that is a closed system.

An additional object of the present invention is to provide an offer redemption system that manages the redemption of offers under controlled conditions.

It is another object of the present invention to provide an offer redemption system that maintains a central master registry of valid offers.

Yet another object of the present invention is to provide an offer redemption system that is to provide an offer clearinghouse for authenticating offer redemption transactions prior to payment for the transactions from the manufacturer to the retailer.

An important object of the present invention is the creation and retention of a complete audit trail of all redeemed offers cleared by the invention which is preserved at the clearinghouse for a specific period of time for review.

DETAILED DESCRIPTION OF THE PREFERRED EMBODIMENT

It will be appreciated that certain elements of the figures are abbreviations or references for elements of the present invention otherwise referenced herein. For example, references to "CEC" and "CEC's" indicate "Cunningham Electronic Corporation" owner by assignment of the instant application but can refer to any operator of the controlled offer redemption system of the present invention. Additionally, it will be appreciated by those skilled in the art that a "transaction log," as used herein, means a record of items purchased during a purchase transaction.

The preferred embodiment of the controlled offer redemption system of the present invention is shown in FIGS. 1 through 7 and is further described herein. The system consists of three primary components in the preferred embodiment: the master offer registry 102, the offer redemption terminal 107, and the offer clearinghouse 103. In the preferred embodiment, the master offer registry 102 and the offer clearinghouse 103 both are stored within a single central data center 101, comprising at least one suitable computer and/or server as well known in the prior art. It will be appreciated, however, that the master offer registry 102 and the offer clearinghouse 103 could be separately stored on suitable computers and/or servers without affecting the operability of the system and without departing from the spirit of the present invention.

Figure 1:
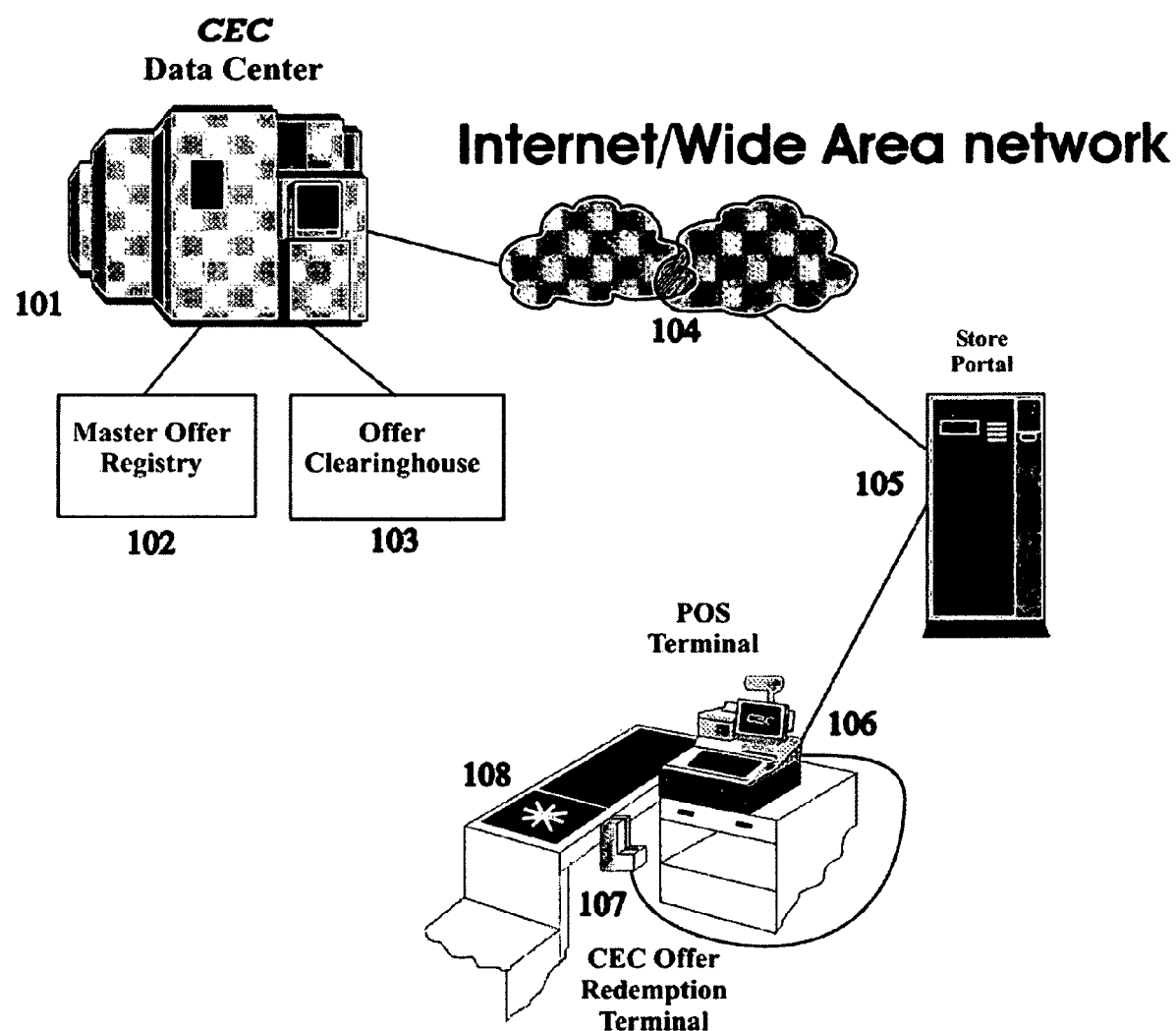
FIG. 1 is a diagram showing relation of the major elements of the offer redemption system in the preferred embodiment of the present invention.

FIG. 1 shows the general operational relationship between the major components of the system in the preferred embodiment. The master offer registry 102, as further discussed below, is an electronic database of manufacturers', retailers', and cooperative offers. It is stored on any suitable software-programmable computer and/or server known in the art. In the preferred embodiment, the master offer registry 102, is stored in data center 101. In turn, data center 101 is capable of communicating with a store portal 105, located at the retailer's physical store location. In the preferred embodiment, such communications occur over a worldwide computer network 104, such as the Internet; however, such communications may occur using prior art dial-up or other networking methods. Additionally, in the preferred embodiment, communications between the store portal 105 and the data center 101 are encrypted or otherwise securely transmitted to protect the integrity and confidentiality of the data.

As further shown in FIG. 1, the store portal 105 also is a software-programmable computer and/or server known in the art and is capable of listening to all POS terminal(s') 106 communications on an in-store POS network. Communication between store portal 105 and POS terminal(s) 106 is accomplished through traditional prior art data communications means, such as an in-store POS network. Using traditional prior art communications means, a offer redemption terminal 107 is connected to each POS terminal 106. Lastly, as well known in the prior art, a product scanning device 108 also interfaces with each POS terminal 106.

The operation of a traditional POS system is well known in the prior art. A product to be purchased is scanned by product scanning device 108 to identify and decode the unique product-identifying barcode data typically printed on the exterior of the product's packaging. Scanning device 108 then cooperates with POS terminal 106 to identify the product being purchased and print a customer receipt. In the preferred embodiment of the present invention, store portal 105 listens to POS terminal's 106 communications and creates a duplicate copy of the transaction. Moreover, the present invention builds on this well-known and well-tested POS system model to add offer validation, verification, and redemption as discussed in detail below.

Offer Registry

Figure 2:
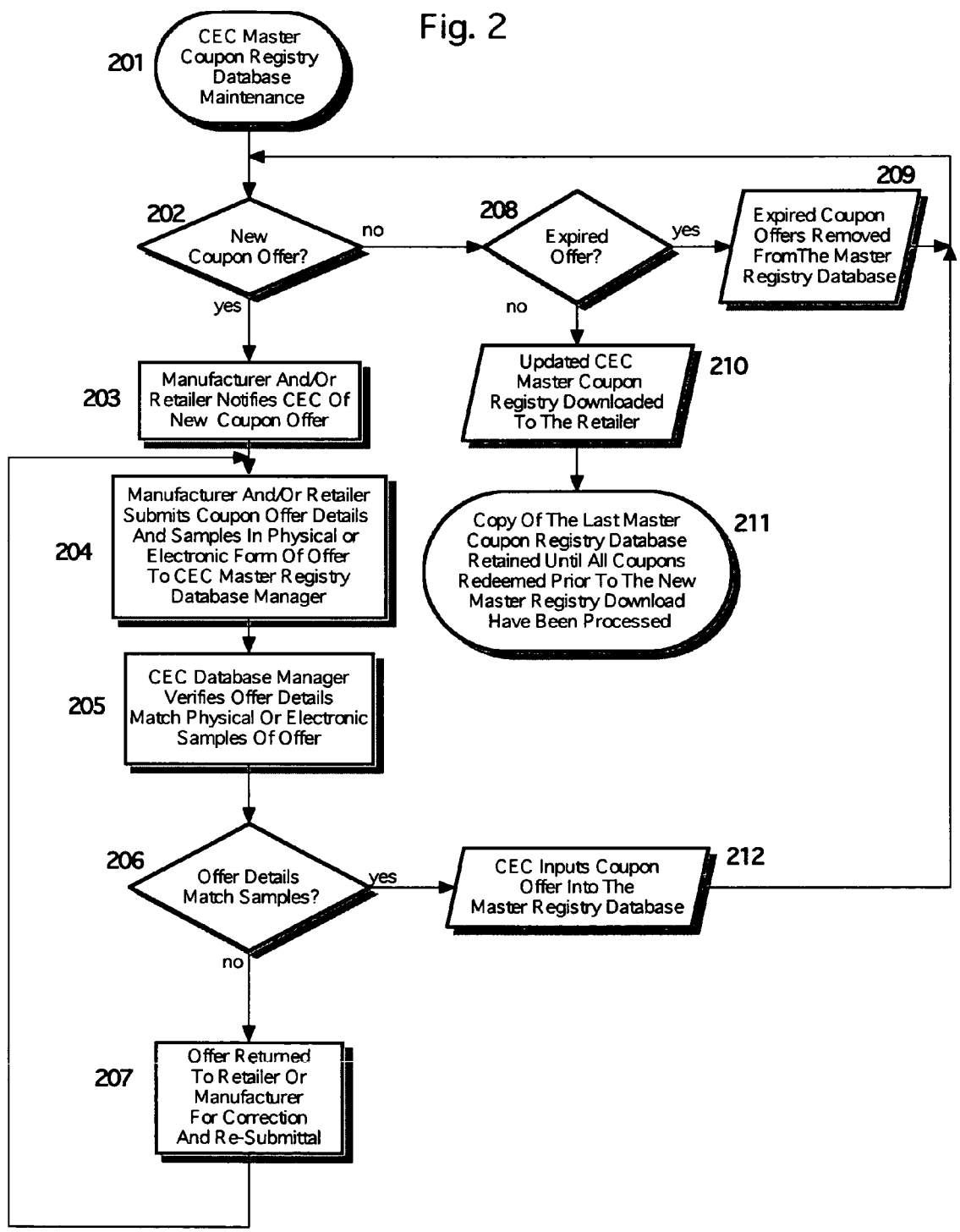
FIG. 2 is a flowchart showing the operation of the master offer registry in the preferred embodiment of the present invention.

As discussed above, the master offer registry 102 (or, "registry" or "master registry") is an electronic database of all valid participating manufacturers', retailers', and cooperative offers that may be validated using the controlled offer redemption system of the present invention. FIG. 2 is a flowchart showing operation of the master offer registry. The master offer registry preferably is maintained at a central location, such as the data center, and is updated on a regular, consistent basis to ensure that the offer data within it is accurate and up-to-date. A copy of the entire master offer registry initially is transmitted to a retailer upon the retailer's participation in the system. The copy of the master registry is stored on the retailer's POS system controller. Thereafter, updates to the master registry are disseminated to the retailer on a regular basis, such as nightly, weekly, or as otherwise needed.

To minimize the amount of data traffic, and the time for registry update data transmissions, registry data updates are transmitted in an ADD/DELETE format, meaning that the entire master offer registry need not be downloaded each time an update is required (however, a full copy of the registry can be downloaded if needed, such as for disaster recovery or other purposes). To further minimize the amount of data traffic, data is expressed in a number series range format, rather than as a discrete series of numbers.

As shown in FIG. 2, maintenance 201 of the master registry involves the addition of new offers and the removal of expired offers. To add 202 a new offer, the manufacturer or retailer first notifies 203 the registry manager of the existence of a new manufacturer's offer. Notification can be by any appropriate means, including by electronic mail, by fax, by secure online (Internet) connection, or by phone (although written notification is preferred in the preferred embodiment). The manufacturer then assembles all pertinent information regarding the new offer and transmits it to the registry database manager 204. In the preferred embodiment, this information includes the following data for a manufacturer's offer:

the product family item codes affected by the offer;
the Uniform Code Council (UCC)-assigned ID number that is printed on the offer;

the product family code that is printed on the offer;

the offer's UCC-assigned value code that is printed on the offer;

the assigned offer issue number that is printed on the offer;

the designated drop date for the offer;

the designated expiration date for the offer that is printed on the offer;

the specific retailer(s) authorized to redeem the offer for cooperative offers; and, a physical, lithographic proof or electronically formatted copy of the offer.

The registry data for a retailer's offer or a cooperative offer is similar, but also includes at least an identification of the specific retailer(s) who is(are) authorized to redeem the offer. Moreover, in the case of a cooperative offer, the offer itself includes contractual restrictions that prevent the offer from being redeemed through unauthorized retailers.

In the preferred embodiment, the registry database manager verifies the offer information against the offer details supplied by the manufacturer or retailer for accuracy 205. If the data matches 206, the offer data is added to the registry 212. If the offer data and the physical samples don't match, the offer is returned to the manufacturer or retailer for correction and re-submittal 207. Under another embodiment of the present invention, the manufacturer or retailer may directly enter its offer data into the master offer registry without the need for a registry database manager to enter the data, such as by using a secure Internet web interface. Any offer entered by the manufacturer or retailer is still subject to final approval by the registry database manager before activation.

In the preferred embodiment, the master offer registry data is downloaded 210 to the retailers' stores via the Internet or a direct dial-up connection to the master offer registry host computer using traditional prior art data communication means. However, any comparable data communications means may be used. An offer's drop date and expiration date control when that offer's record is added to, and removed from, the master offer registry; thus, an offer is removed from the master offer registry following the offer expiration date 208, 209. Finally, copies of prior master offer registries are maintained until all of the offers redeemed under such registries are processed 211.

Offer Validation and Verification Process

Figure 3:
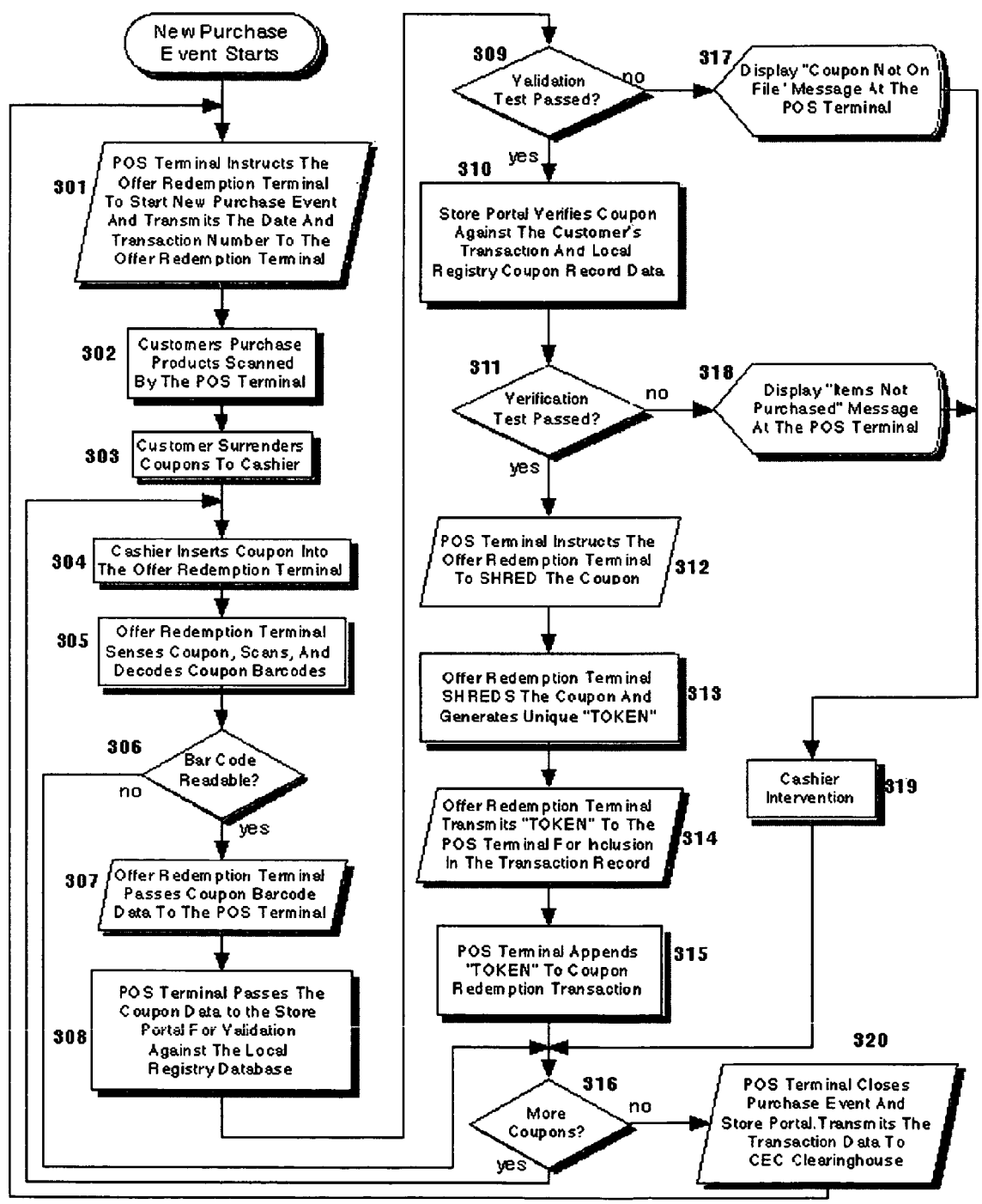
FIG. 3 is a flowchart showing the operation of the store portal offer validation and verification process in the preferred embodiment of the present invention.

As shown in FIG. 3, the offer validation and verification process begins when the retailer's POS terminal initiates a new purchase event record and transmits that record number and current date to the offer redemption terminal 301. Next, all of the customer's purchases are scanned by the POS terminal 302 and the customer surrenders their offers to the cashier for redemption 303. The cashier then inserts each offer individually into the reader slot in the offer redemption terminal 304.

Once an offer has been inserted into the slot, the offer redemption terminal senses its presence, and reads and decodes the barcode printed on the offer 305. If the offer redemption terminal can decode the barcode 306, the decoded data is sent to the POS terminal 307. The POS terminal passes the coupon data on to the store portal 308. If the offer is unreadable, the offer redemption terminal begins looking for a new coupon to scan 316.

When the store portal receives the offer's decoded barcode information, it first attempts to validate the offer by looking in its copy of the registry (stored on the store portal) for a matching record 309. Offers that do not have a matching record in the registry are rejected 317 and cashier intervention is requested 319. Offers that pass this validation test 309 are passed onto the verification process 310. During the verification process 310, the POS purchase event transaction log ("TLOG") is scanned to verify that the offer's redemption requirements have been met (such as the correct product family item, size, quantity, combination, etc.) and that the offer is being redeemed through a retailer properly authorized to redeem the offer. If all of the offer's requirements have not been met, an error message is displayed on the POS terminal's display 318 and cashier intervention is requested 319.

If all of the offer's requirements have been met, the offer passes the verification test 311, and the POS terminal sends a command to the offer redemption terminal instructing the offer redemption terminal to turn on its shredder so that the offer can be destroyed 312. After the offer destruction is complete, the offer redemption terminal calculates a unique "token" based on the offer redemption transaction 313. The token is a number that is calculated based on a mathematical algorithm, which can be based on any number of variables from the offer redemption transaction. The token can be based on any desired mathematical algorithm without affecting the operation of the system, but the algorithm should be kept confidential to maintain the integrity of the system. Thus, in the preferred embodiment of the present invention, the algorithm for calculating the token resides securely within the flash memory of the microprocessor of the offer redemption terminal. Such security prevents the algorithm from being extracted or read thereby minimizing the likelihood that the algorithm may be determined by reverse engineering of the machine code.

In the preferred embodiment of the present invention used for redemption of manufacturers' offers, the token is based on a proprietary mathematical algorithm that uses the following numeric variables:

the manufacturer's UCC number (encoded in the offer's UPC coupon barcode);

the offer family code (encoded in the offer's UPC coupon barcode);

the offer value code (encoded in the offer's UPC coupon barcode);

the offer issue number (encoded in the offer's UCC/EAN-128 coupon barcode);

the retailer's UCC number;

the retailer's division number;

the retailer's store number;

the current transaction date; and, the current transaction number from the POS terminal.

The preferred algorithm used for retailers' offers and cooperative offers may use different variables to create the tokens for such offers. The token then is transmitted to the POS terminal 314 where it is appended to the offer's redemption entry in the TLOG 315.

When all offers have been processed in the manner previously described 316, the POS terminal cashes out the purchase event and transmits the TLOG to the POS system controller. The store portal hears this message, closes the current transaction, removes all entries from the TLOG that are not associated with an offer redemption and transmits the modified TLOG to the offer clearinghouse for further processing 320.

Offer Redemption Terminal

Figure 4:
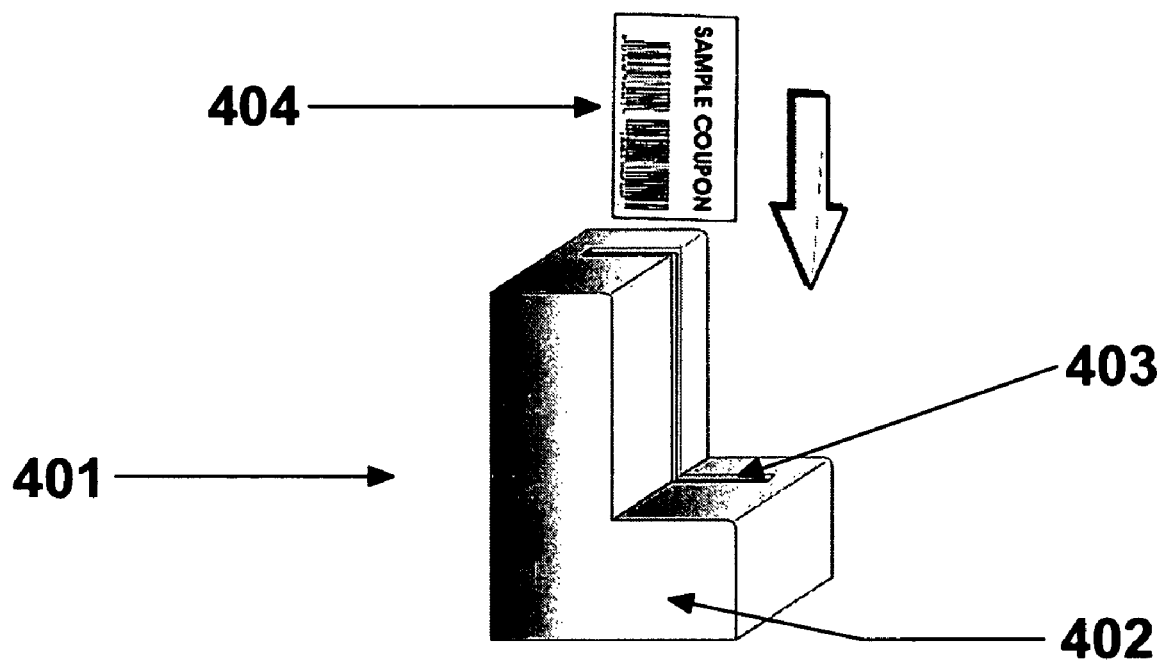
FIG. 4 is a perspective view of the offer redemption terminal in the preferred embodiment of the present invention.

As shown in FIG. 4, the offer redemption terminal 401 is a type of document shredder with the internal capability to read and decode barcoded information. Although the device is specifically designed to process redemption offers in the retail environment, the general construction of such devices is well known in the prior art. The exterior of the offer redemption terminal in the preferred embodiment of the present invention is shown in FIG. 4, and generally comprises an exterior housing 402 and slot 403 for receiving offers 404.

Figure 5:
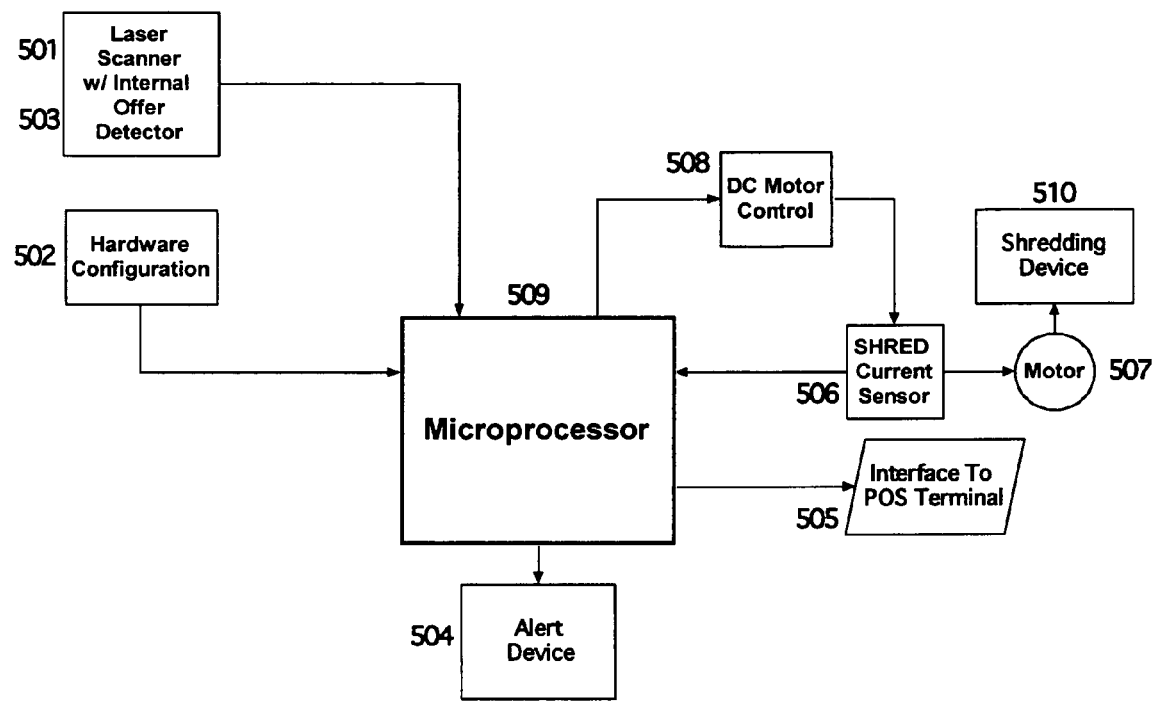
FIG. 5 is a block diagram of the offer redemption terminal in the preferred embodiment of the present invention.

FIG. 5 shows the configuration of the offer redemption terminal's internal components, namely: a microprocessor 509, a laser scanner 501 with an internal offer detector 503, an alert device 504, a DC motor control 508, a means to monitor the shredding of the coupon offer 506, a DC motor 507 connected to a shredding device 510, a hardware configuration data storage means 502, and an interface 505 to the retailer's POS terminal.

Figure 6:
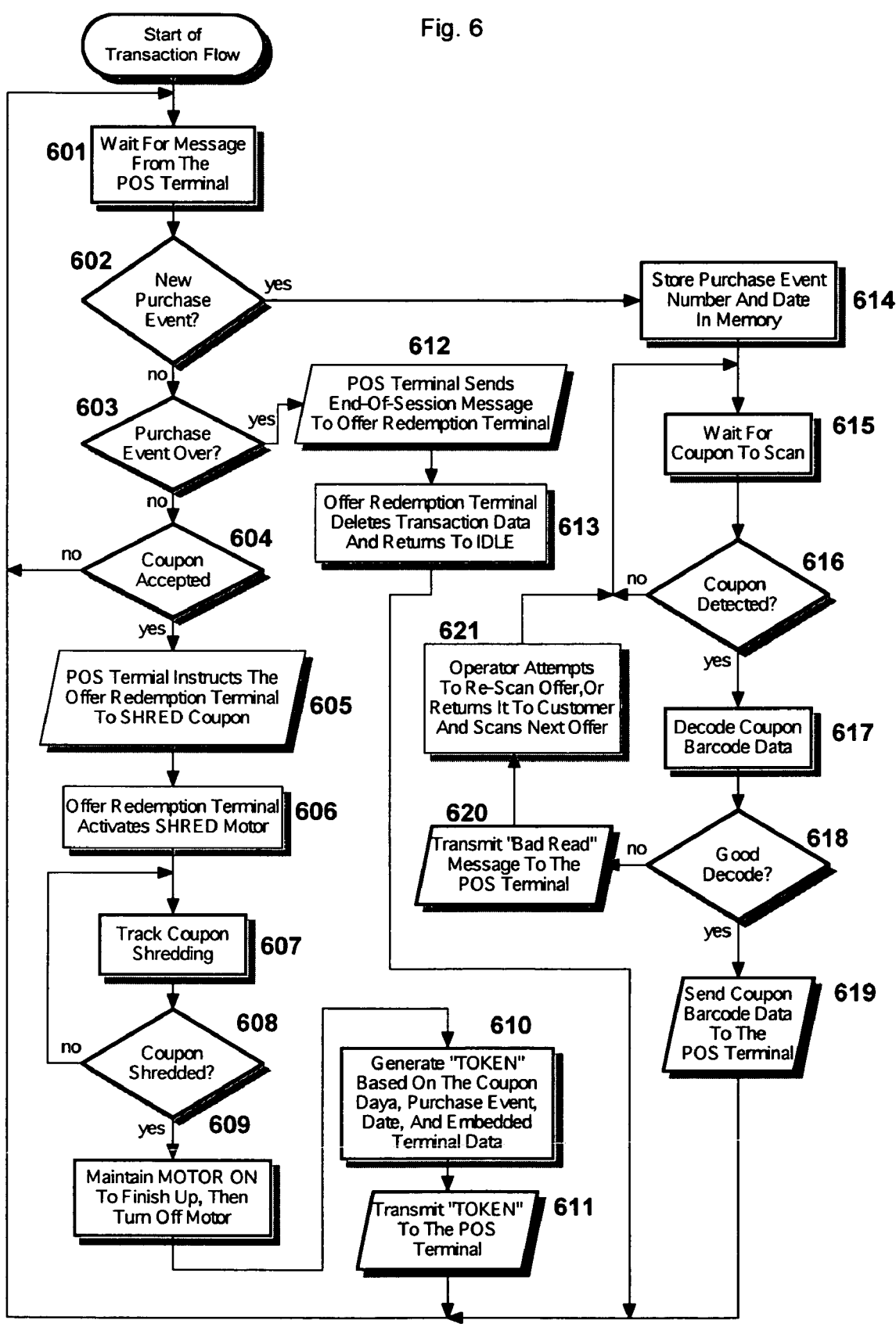
FIG. 6 is a flowchart showing the operation of the offer redemption terminal in the preferred embodiment of the present invention.

In operation, as shown in FIG. 6, the offer redemption terminal remains passive until it receives a new purchase event communication from the retailer's POS terminal 601. The new purchase event message 602 causes the offer redemption terminal to store the purchase event number and date in its memory 614 and forces the offer redemption terminal to begin looking for a offer to be inserted into its reader slot 615. When an offer is detected 616, the offer redemption terminal activates its barcode scanner and attempts to locate a barcode on the offer 617. In the preferred embodiment, the offer's barcode must have both a UPC coupon code and UCC/EAN-128 coupon extended offer code portion or an RSS barcode to be valid (further barcode symbology may require other code portions). The barcode is read and decoded using standard, prior art reading and decoding technology. A properly decoded offer barcode 618 is forwarded to the POS terminal for validation and verification 619, as described above. An offer that cannot be read is reported to the POS terminal as a unreadable 620. The cashier then can either try to reinsert the offer into the terminal, or return it to the customer 621.

If an offer has been properly validated and verified by the POS terminal 604, the POS terminal sends a shred message to the offer redemption terminal 605. When a shred message is received from the POS terminal, the offer redemption terminal activates its internal shredder and destroys the offer, rendering it invalid for subsequent use 606. To ensure that the offer has been destroyed, the offer's progress is tracked as it moves toward and through the shredder 607. This tracking process precludes a cashier from inserting a blank document into the paper path after an offer has been read and then extracting the offer when the shredding process begins. Once the offer has passed the sensors 608, the shredder motor remains active for a short period to ensure that the entire document has been destroyed 609. In another embodiment of the present invention, the offer's destruction may be confirmed by monitoring the shredder motor current. The shredder motor current increases as the shredder motor operates to destroy the offer and decreases once the offer has passed through the shredder. Undoubtedly, other offer destruction sensing means exist in the prior art and any such means to confirm the destruction of an offer may be utilized within the system of the present invention without departing from the scope of this disclosure.

Once the offer has been destroyed, the offer redemption terminal generates the token, as previously described, to uniquely identify the offer redemption transaction 610. The token is transmitted to the POS terminal which appends it to the offer redemption entry in the purchase event's TLOG 611. When the POS terminal closes the purchase event 603, a message is sent to the offer redemption terminal to indicate the end of that session 612. The terminal then deletes the current transaction data and returns to its idle state until the next purchase event 613. The TLOG, along with all appended tokens, is stored in the POS system controller for transmission to the offer clearinghouse.

Offer Clearinghouse

The offer clearinghouse ("clearinghouse") is a software program operating on a computer that performs the final validation and verification of all offers redeemed through the offer redemption system of the present invention, generates all invoicing to the participating manufacturers, and transfers the offer redemption amounts and handling fees to the participating retailers.

Figure 7:
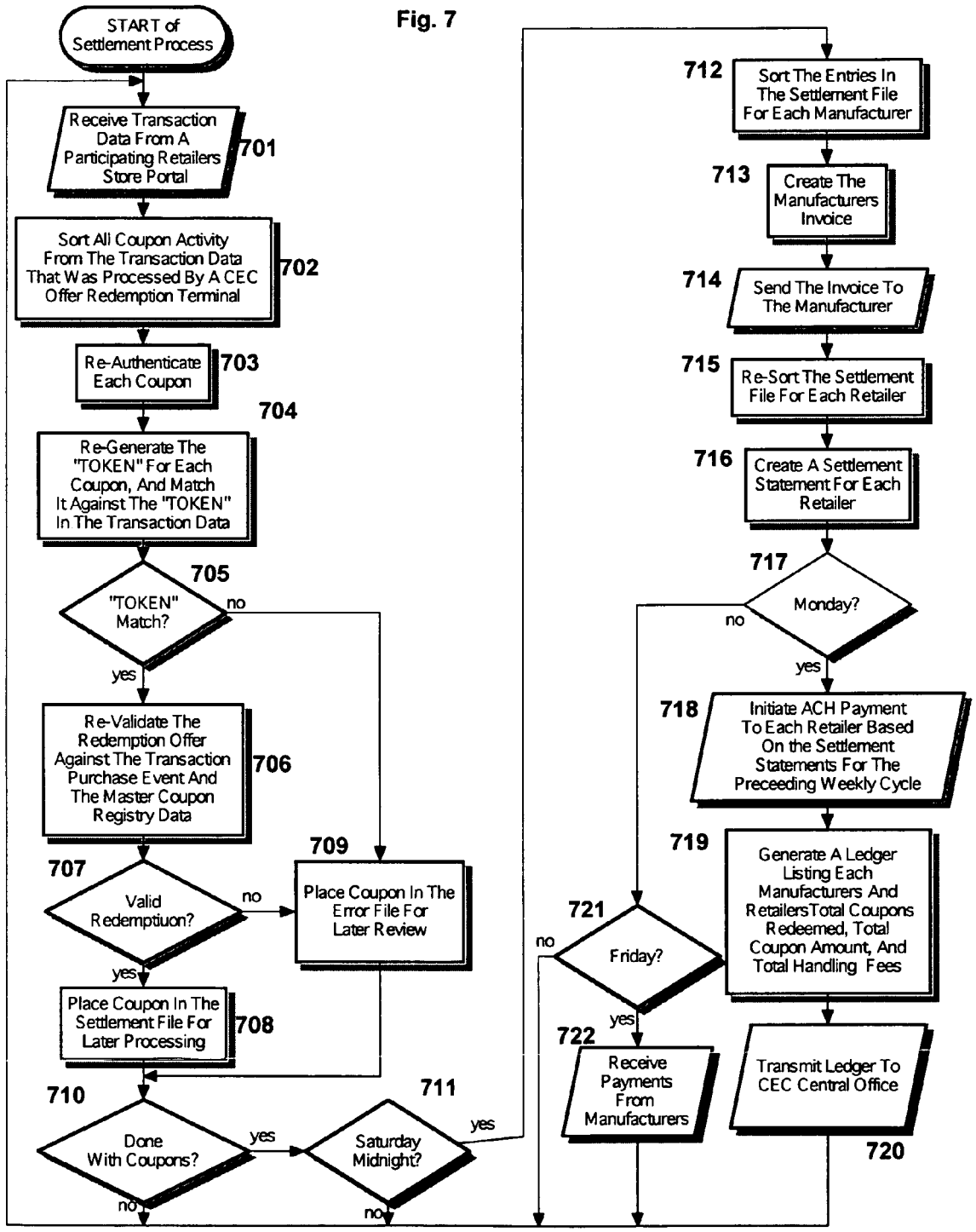
FIG. 7 is a flowchart showing the operation of the settlement process at the offer clearinghouse in the preferred embodiment of the present invention.

As shown in FIG. 7, the clearinghouse receives the purchase event transaction logs ("TLOGs") from cashed out purchase events as communicated from the store portal 105 at participating retailers 701. The clearinghouse first sorts the TLOG offer redemption activity 702. Each of the redeemed offers then is authenticated 703 by regenerating the token using the same data and algorithm that the offer redemption terminal used to create the initial token 704. In the preferred embodiment, the token can be regenerated by passing the TLOG data from the clearinghouse to an attached serial token regeneration device. In another embodiment, the token may be regenerated using a software component of the clearinghouse programming. Either method regenerates the token using the proper algorithm and communicates the token back to the clearinghouse. As in the offer redemption terminal discussed above, the algorithm for calculating the token resides securely within clearinghouse computer or the serial device. Such security prevents the algorithm from being extracted or reverse engineered.

If the two tokens match 705, then the authentication is considered complete. Next the offer is reverified and revalidated against the purchased items in the TLOG and offer requirements listed in the offer's registry record 706. Once this test has been successfully completed 707, the offer is placed into an electronic settlement file 708. Offers in the settlement file then await further processing as described below. If the initial token and the regenerated token do not match, or if the offer fails reverification and/or revalidation, the offer is placed in an electronic error file for later manual review 709. Offers in the "error" file are manually processed to verify the legitimacy of their redemption and are manually reimbursed when their status has been cleared. The authentication, reverification, and revalidation cycle is repeated for each offer 710.

The settlement file is sorted regularly, every Saturday at midnight 711 in the preferred embodiment. The first sort of the settlement file sorts redeemed offers by manufacturer 712. Once the offers are sorted, the clearinghouse creates 713 and sends 714 invoices to all participating manufacturers for which offers have been redeemed. The invoices list the quantity and dollar amount of each offer redeemed over the past week (in the preferred embodiment) and their associated handling fees. Invoices to the manufacturers may be sent by email (in the preferred embodiment), facsimile, and/or postal mail. In the preferred embodiment, manufacturer's payment 722 of invoices to the clearinghouse is due by the Friday 721 following the invoice date.

The settlement file then is re-sorted by retailer 715 and settlement statements for each participating retailer are prepared 716. The settlement statements list the quantity, dollar amount, and the retailer's handling fees associated with those offers redeemed at each of the retailer's stores. In the preferred embodiment, this statement is electronically transmitted to the retailer, but may also be sent by facsimile and/or postal mail.

In the preferred embodiment, on the Monday following the Friday due date for payments from the manufacturers 717, the clearinghouse initiates automated clearinghouse (ACH) payments to the retailers' bank accounts for the amounts reflected on the settlement statements for the previous weekly cycle offer redemption activity 718. The clearinghouse then generates a ledger for internal recordkeeping purposes 719. The ledger lists each participating manufacturer, their total offers redeemed, the total offer dollar amount, and the total handling fees associated with those offer. There are also line items for each participating retailer. These entries include the total offers redeemed at each of the retailer's stores, the total offer dollar amount, and the total dollar amount of their handling fees. For secure storage, in the preferred embodiment the ledger is transmitted to a storage facility 720.

It will be appreciated that the timing for the above mentioned manufacturers' invoices, manufacturers' payment on such invoices, retailer's settlement statements, retailer's ACH payments, and ledger generation may vary from those identified in the preferred embodiment without departing from the scope and spirit of this invention. For example, manufacturers' invoices may be settled nightly instead of weekly and payments from manufacturers made the following day, with payments to retailers following a day after such manufacturers' payments.

The embodiments of the present invention described above are to be regarded in all respects as merely illustrative and not restrictive. Accordingly, the present invention may be embodied in other specific forms without deviating from the spirit thereof.

We claim:

1. A controlled offer redemption system for the redemption of an offer, the offer having at least one redemption requirement, the system comprising:
   an offer registry;
   a point of sale system, the point of sale system having at least one store portal and configured to generate a transaction log during a product purchase transaction;
   an offer redemption terminal; and
   an offer clearinghouse;
   wherein the offer redemption terminal is configured to generate an initial token, the initial token based on and comprising data generated by the point of sale system during the purchase transaction, and wherein the offer clearinghouse is configured to create a regenerated token and to compare said regenerated token with said initial token to authenticate an offer redemption transaction, and wherein the at least one store portal is configured to compare the offer against the offer registry to validate the offer, to compare the at least one redemption requirement to the transaction log to verify that the at least one redemption requirement has been satisfied, and to verify that said offer is being redeemed through a retailer properly authorized to redeem said offer.

2. The controlled offer redemption system of claim 1 wherein the offer clearinghouse is stored in a central data center.

3. The controlled offer redemption system of claim 1 wherein said offer registry comprises an electronic database of offers stored on a computer.

4. The controlled offer redemption system of the claim 3 wherein said electronic database of offers comprises at least one database record comprising identifying information regarding at least one offer.

5. The controlled offer redemption system of claim 4 wherein said at least one database record comprising identifying information regarding at least one offer further comprises:
   an offer product family item code;
   an offer product identification number;
   an offer product family code;
   an offer product value code;
   an offer issue number;
   an offer start date;
   an offer expiration date; and
   an identification of at least one retailer authorized to redeem said offer.

6. The controlled offer redemption system of claim 1 wherein said point of sale system comprises at least one point of sale system controller and at least one point of sale terminal, the at least one store portal in communication with said point of sale system controller.

7. The controlled offer redemption system of claim 6 wherein said point of sale system controller is configured to maintain a copy of said offer registry.

8. The controlled offer redemption system of claim 7 wherein said point of sale system controller is configured to update said copy of said offer registry.

9. The controlled offer redemption system of claim 6 wherein said at least one point of sale terminal is configured to communicate with said offer redemption terminal.

10. The controlled offer redemption system of claim 1 wherein said offer redemption terminal comprises:
    a microprocessor;
    a laser scanner;
    an offer detector;
    an alert device;
    a direct current motor control;
    a direct current motor connected to an offer destruction device; and
    an interface to said point of sale system,
    wherein the offer redemption system is configured to monitor the destruction of an offer, and wherein the offer redemption system is configured to store data comprising a hardware configuration.

11. The controlled offer redemption system of claim 1 wherein said offer redemption terminal is configured to read and decode barcode data on an offer.

12. The controlled offer redemption system of claim 11 wherein said offer redemption terminal is further configured to communicate said barcode data to said point of sale system.

13. The controlled offer redemption system of claim 12 wherein said offer redemption terminal is further configured to permanently destroy said offer.

14. The controlled offer redemption system of claim 12 wherein said offer redemption terminal further comprises a shredder configured to permanently destroy said offer.

15. The controlled offer redemption system of claim 13 wherein said offer redemption terminal is further configured to generate said initial token only after said offer is permanently destroyed.

16. The controlled offer redemption system of claim 1 wherein said offer redemption terminal and said offer clearinghouse are configured to generate said initial token and said regenerated token using a mathematical algorithm based on data collected during the redemption of said offer.

17. The controlled offer redemption system of claim 16 wherein said mathematical algorithm based on data collected during the redemption of said offer comprises a plurality of variables.

18. The controlled offer redemption system of claim 17 wherein said plurality of variables comprises:
    a manufacturer's Uniform Code Council number;
    a manufacturer's offer family code;
    a manufacturer's offer value code;
    a manufacturer's offer issue number;
    a retailer's Uniform Code Council number;
    a retailer's division number;

a retailer's store number;
a current transaction date; and,
a current transaction number.

19. The controlled offer redemption system of claim 1 wherein said offer clearinghouse is configured to communicate with said point of sale system through said at least one store portal.

20. The controlled offer redemption system of claim 19 wherein said offer clearinghouse system is further configured to communicate with said offer registry.

21. The controlled offer redemption system of claim 20 wherein said offer clearinghouse is further configured to authenticate, validate and verify said offer.

22. The controlled offer redemption system of claim 21 wherein said offer clearinghouse is further configured to compare said offer against said offer registry and to compare said at least one redemption requirement of said offer to said transaction log to authenticate, validate and verify said offer.

23. The controlled offer redemption system of claim 22 wherein said offer clearinghouse is further configured to segregate offers which cannot be authenticated, verified, or validated.

24. The controlled offer redemption system of claim 1 wherein said offer clearinghouse is configured to create a manufacturer's invoice.

25. The controlled offer redemption system of claim 1 wherein said offer clearinghouse is configured to create a retailer's statement.

26. The controlled offer redemption system of claim 1 wherein said offer clearinghouse is configured to automate payment from a manufacturer to a retailer for said manufacturer's offer redemption transactions.

27. The controlled offer redemption system of claim 24, 25, or 26 wherein said offer clearinghouse is configured to generate a ledger.

28. A method for verifying, validating, and authenticating manufacturers, retailers', and cooperative offer redemption transactions comprising the steps of:
   providing an offer registry stored as a database on a computer, the offer registry having at least one offer, the offer having at least one redemption requirement;
   validating an offer presented to a redeeming retailer by comparing said presented offer to said offer registry;
   verifying said presented offer by comparing said at least one redemption requirement of said offer against a transaction log generated from a product purchase transaction and by comparing said redeeming retailer of said presented offer to a database of authorized retailers;
   offer redemption terminal permanently destroying said presented offer after said presented offer is validated and verified, the offer redemption terminal configured to permanently destroy said presented offer so that said presented offer cannot be reused;
   the offer redemption terminal generating an initial token after said presented offer is permanently destroyed, the initial token based upon and comprising data generated by the point of sale system during the purchase transaction;
   offer clearinghouse creating a regenerated token; and authenticating said offer redemption transaction by comparing said initial token and said regenerated token.

29. The method according to claim 28 further comprising the steps of:
   generating a manufacturer's invoice;
   generating a retailer's statement; and
   automating payment from a manufacturer to a retailer for said offer redemption transactions.

* * * * *